United States Patent [19]

Seidel

[11] 3,719,987

[45] March 13, 1973

[54] TOOL CHANGE APPARATUS
[75] Inventor: William B. Seidel, Cincinnati, Ohio
[73] Assignee: Cincinnati Milacron Inc., Cincinnati, Ohio
[22] Filed: May 10, 1971
[21] Appl. No.: 141,536

[52] U.S. Cl. .................................29/568, 29/26 A
[51] Int. Cl. ..................................B23q 3/157
[58] Field of Search ........................29/568, 26 A

[56] References Cited

UNITED STATES PATENTS 3,591,920   7/1971   Brainard...............................29/568
3,530,570   9/1970   Shotter.................................29/568

FOREIGN PATENTS OR APPLICATIONS 1,235,705   3/1967   Germany.............................29/568

*Primary Examiner*—Andrew R. Juhasz
*Assistant Examiner*—Z. R. Bilinsky
*Attorney*—Howard T. Keiser and Jack J. Earl

[57] ABSTRACT

An apparatus for synchronizing movements of a tool storage belt or chain with the movements of the spindle carrier of a machine tool so as to permit a tool change to be effected in all positions of the spindle carrier.

1 Claim, 2 Drawing Figures

PATENTED MAR 13 1973  3,719,987

INVENTOR.
WILLIAM B. SEIDEL
BY
Howard T. Keiser
& Jack J. Earl
ATTORNEYS

TOOL CHANGE APPARATUS

BACKGROUND OF THE INVENTION

Machine tools of the type in which the tool is supported for movement relative to the base or frame of the machine present a problem when consideration is given to the application of a automatic tool changer thereto. In such case, the tool storage mechanism must either be supported on the movable spindle carrier itself, or it must be supported on the frame of the machine. If it is mounted on the spindle carrier, then this element must support the weight and bulk of the storage magazine while at the same time being capable of accurate positioning movements as required in order to adjust the tool relative to the workpiece. In the event that the magazine is mounted on the machine base, or on a separate support, some means must then be provided for aligning the tool carrier with the storage magazine before an exchange of tools can take place. Neither of these solutions is wholly satisfactory, the first posing structural design problems and the second introducing an undesirable time delay in moving the tool carrier to a fixed tool change position.

Various strategms have been resorted to in an effort to overcome these problems such as utilizing a shuttle mechanism for transferring the tool to an intermediate position which is in relative proximity to the spindle as shown by U.S. Pat. No. 3,161,951, granted Dec. 22, 1964 to Myron L. Anthony; providing an extensible guideway between a stationary tool magazine and a movable column supporting the spindle carrier along which a tool change carriage may shuttle as shown by U.S. Pat. No. 3,242,568, granted Mar. 29, 1966 to J. N. Flannery et al; moving the tool magazine in synchronism with the spindle carrier but on a separate support as shown by U.S. Pat. No. 3,300,856, granted Jan. 31, 1967 to J. Daugherty; and causing a tool storage chain to follow the movements of a machine tool column by means of a tracer mechanism which senses relative movement between the chain and the column as shown by U.S. Pat. No. 3,541,677 granted Nov. 24, 1970 to R. Fiegler. However, all of the expedients attempted in order to overcome to problem have required the addition of complicated and costly mechanisms to the machine tool structure.

SUMMARY OF THE INVENTION

The present invention provides a simple and inexpensive solution to the problem of enabling tools to be changed in any position of the spindle carrier from a magazine mounted on the column thereby facilitating a rapid interchange of tools and reducing the time required therefor to a minimum. This is accomplished through the use of a differential having two inputs; one for moving the magazine to bring the new tool into position, and one from the spindle carrier positioning mechanism to correct for any change in the position of the spindle subsequent to the previous interchange. The output of the differential then signifies the amount of movement of the magazine required to bring the new tool into alignment with the adjusted position of the spindle so as to be ready for the next interchange. The tool change mechanism is mounted on the spindle carrier and is therefore always in position to effect the interchange.

IN THE DRAWINGS

Figure 1:
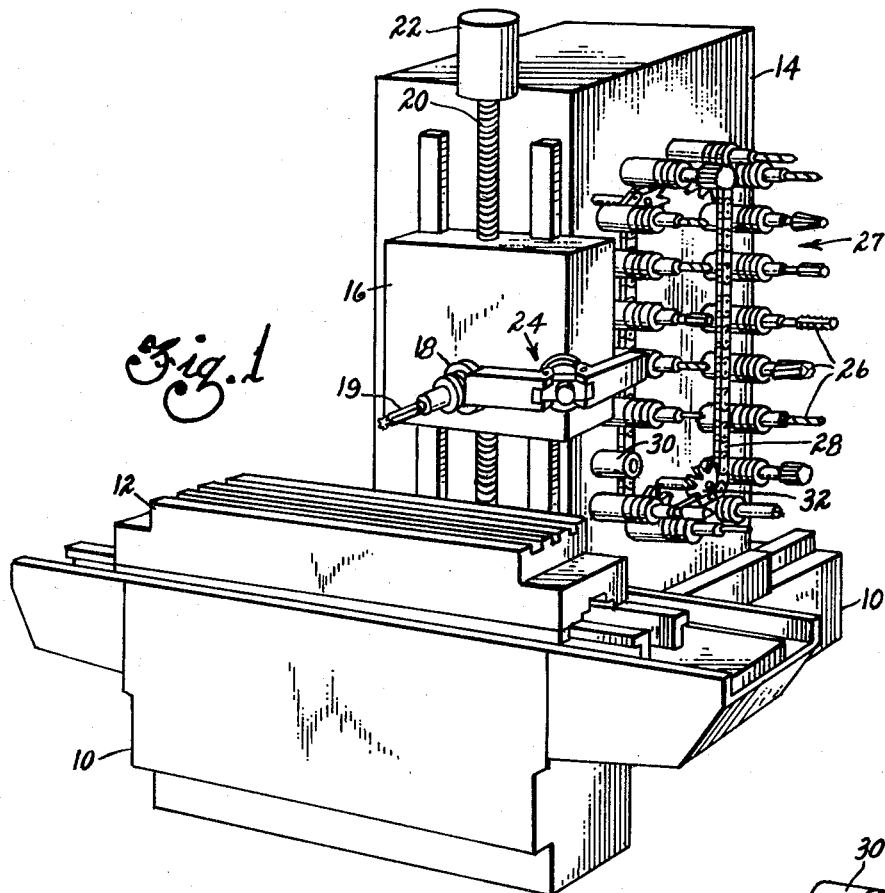
FIG. 1 is a perspective view of a machine tool incorporating the present invention.

The tool magazine spindle carrier alignment mechanism forming the subject matter of the present invention may be applied to practically any machine tool configuration in which the spindle carrier moves with respect to the tool storage magazine and wherein the tool change mechanism is mounted to move with the spindle carrier in order that it will be in alignment with the spindle at the moment of interchange. One such configuration is shown in FIG. 1 in which a machine tool having a T-shaped base 10 is provided with a first pair of horizontal ways supporting a sliding table 12 and a second pair of horizontal ways supporting a sliding column 14. The front face of the column 14 is provided with a pair of vertically extending ways on which a spindle carrier 16 is mounted for vertical sliding movement. A spindle 18 and its related drive mechanism is mounted on the spindle carrier and is adapted to hold a tool 19 for operating on a workpiece supported on the table 12. Vertical positioning of the spindle carrier is effected by means of a lead screw 20 driven by a motor 22. The spindle carrier also supports a tool change mechanism 24 which is adapted to automatically remove the tool 19 from the spindle and replace it with one of the tools 26 carried by a tool storage magazine 27 mounted on the side of the column 14.

As shown herein, the magazine takes the form of a chain 28 which is disposed with a portion of its length extending parallel to or equi-distant from the path of movement of the spindle 18 as it is moved vertically on the column by the spindle carrier 16. The chain is provided with sockets 30 for receiving the tools 26. The chain may be supported by sprockets 32 which are driven in a manner hereinafter to be described for moving the chain to bring a new tool into alignment with the spindle where it may be interchanged with a tool in the spindle by the tool change mechanism.

Figure 2:
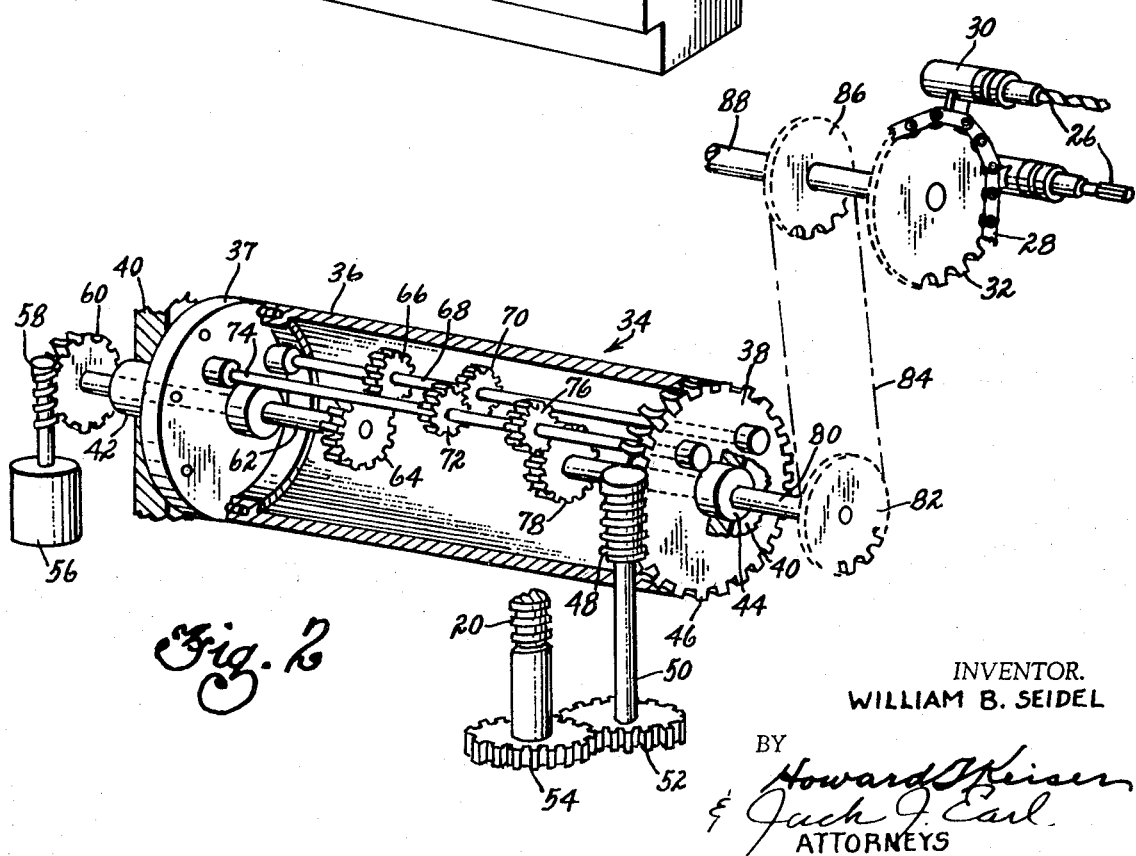
FIG. 2 is a schematic view showing the differential mechanism as applied to the machine tool of FIG. 1.

As shown in FIG. 2, the sprockets 32 are adapted to be driven by the output of a differential 34 supported within the column 14 of the machine tool. The differential may be of any suitable design and the particular form shown herein is only for the purpose of illustrating the invention.

In the present embodiment, the differential includes a carrier or housing 36 provided with end plates 37 and 38 which are journaled for rotation in a framework 40 by trunions 42 and 44. The end plate 38 is provided on its periphery with worm gear teeth 46 which mesh with a worm 48 carried by a shaft 50. The shaft 50 is drivingly connected by gears 52 and 54 with the lead screw 20 so that positioning movements of the spindle carrier 16 provides one input to the differential through rotation of the carrier 36 on its trunions 42 and 44. A second input to the differential is effected by a tool selection actuator 56 which may be controlled in a known manner to bring the tool required for the next machining operation into the tool change position. The actuator drives a worm 58 which meshes with the teeth of a worm wheel 60 mounted on the end of a shaft 62 journaled in the end plate 37. This shaft carries a gear 64 meshing with a gear 66 mounted on a shaft 68 supported for rotation between the end plates 37 and 38 of the carrier 36. Fixed to the shaft 68 is a second gear 70 which meshes with a gear 72 mounted on a shaft 74, mounted for rotation between the end plates of the carrier 36. Also secured to this shaft 74 is a further gear 76 meshing with a gear 78 secured to the inner end of an output shaft 80 rotatably journaled in the end plate 38. Thereby, the input applied to the gear 64 is transmitted to the output gear 78 but in a reverse direction. The output shaft 80 carries a sprocket 82 connected by a chain 84 with a second sprocket 86 secured to a shaft 88 on which the drive sprocket 32 for the chain 28 is mounted. It will thus be seen that the tool store magazine is driven in accordance with the input from the tool selection actuator 56 as modified by the position of the spindle carrier which adds to or subtracts from the movement supplied by the actuator 56 depending on the direction of movement of the carrier 16. Hence, the drive to the tool storage magazine is modified as necessary to insure alignment of the new tool 26 with the spindle 18 in any position of the carrier so that interchange of the tools by the mechanism 24 can take place without further adjustment of the spindle carrier.

It will be understood that the foregoing description relates to a preferred embodiment of the invention only and that other arrangements and constructions may be resorted to without departing from the scope of the invention as defined by the appended claims.

What is claimed is:

1. In a tool change apparatus for a machine tool having a spindle, a tool magazine for storing a series of tools for utilization in the spindle, means supporting said spindle for movement along a predetermined path relative to said magazine, said magazine having a portion of its length arranged to extend parallel to the path of movement of the spindle, and a tool change unit moving with said spindle for removing a tool therefrom and replacing it with a tool from the magazine, the combination of means for moving said spindle to selected positions along its path of movement, means for actuating said tool magazine to bring a selected tool therein into alignment with said spindle, and means responsive to said spindle moving means and said magazine actuating means for operating the magazine to move a selected tool therein into alignment with the spindle in any position thereof along its path of movement, including a mechanical differential having two input shafts, one connected to said spindle moving means and the other connected to said magazine actuating means, and an output shaft drivingly connected to said tool storage magazine.

* * * * *